(12) United States Patent
Arora et al.

(10) Patent No.: US 10,572,183 B2
(45) Date of Patent: Feb. 25, 2020

(54) POWER EFFICIENT RETRAINING OF MEMORY ACCESSES

(71) Applicant: Advanced Micro Devices, Inc., Sunnyvale, CA (US)

(72) Inventors: Sonu Arora, Bangalore (IN); Guhan Krishnan, Acton, MA (US); Kevin Brandl, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 94 days.

(21) Appl. No.: 15/787,459

(22) Filed: Oct. 18, 2017

(65) Prior Publication Data

US 2019/0114109 A1 Apr. 18, 2019

(51) Int. Cl.
*G06F 12/00* (2006.01)
*G06F 13/00* (2006.01)
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0673* (2013.01)

(58) Field of Classification Search
CPC .... G06F 3/0659; G06F 3/0604; G06F 3/0611; G06F 3/0673
USPC ........................................................ 711/105
See application file for complete search history.

(56) References Cited

U.S. PATENT DOCUMENTS

| | | | | |
|---|---|---|---|---|
| 5,495,452 A * | 2/1996 | Cha | ........ | G11C 11/406 365/191 |
| 6,047,248 A * | 4/2000 | Georgiou | ........ | G06F 1/206 702/132 |
| 6,778,457 B1 * | 8/2004 | Burgan | ........ | G11C 11/406 365/201 |
| 6,781,908 B1 * | 8/2004 | Pelley | ........ | G11C 7/1045 365/201 |
| 6,889,332 B2 * | 5/2005 | Helms | ........ | G06F 1/206 702/132 |
| 7,484,140 B2 * | 1/2009 | Pelley | ........ | G11C 7/04 365/201 |
| 7,647,467 B1 * | 1/2010 | Hutsell | ........ | G06F 13/4239 711/105 |
| 9,535,623 B1 * | 1/2017 | Lee | ........ | G06F 3/0619 |
| 2002/0169924 A1 * | 11/2002 | Osborn | ........ | G06F 1/206 711/106 |

(Continued)

OTHER PUBLICATIONS

Cadence Design Systems, Inc., "DDR PHY Interface," DFI 3.1 Specification, Mar. 21, 2014, 141 pages.

*Primary Examiner* — Sheng Jen Tsai
(74) *Attorney, Agent, or Firm* — Polansky & Associates, P.L.L.C.; Paul J. Polansky; Rosalynn M. Smith

(57) ABSTRACT

A data processing system includes a memory and a data processor. The data processor is connected to the memory and adapted to access the memory in response to scheduled memory access requests. The data processor has power management logic that, in response to detecting a memory power state change, determines whether to retrain or suppress retraining of at least one parameter related to accessing the memory based on an operating state of the memory. The power management logic further determines a retraining interval for retraining the at least one parameter related to accessing the memory, and initiates a retraining operation in response to the memory power state change based on the operating state of the memory being outside of a predetermined threshold.

19 Claims, 5 Drawing Sheets

RETRAINING TABLE 400

| DDR(MT/s) | tCK | UI | Eye Window | 1tCK pre: 0.8UI | DQS shift due to voltage variation +/- 2.5% AC Ripple @ 7ps/mV | DQS shift due to temperature shift Solve for degrees C | Solve for Retrain Interval(s) C/s for the given system | Retraining Enabled? | Retraining Interval(s) |
|---|---|---|---|---|---|---|---|---|---|
| | ps | ps | Drift Allowance | 2tCK pre: 1.4UI | Drift Rate: 7ps/mV | 4ps/C | 100 | | |
| 1333.333 | 1500 | 750 | 1TCK | | 600 | 215 | 54 | 0.538 | Yes | 0.54 |
| | | | 2TCK | | 1050 | 665 | 166 | Unlimited | No | NA |
| 1600.000 | 1250 | 625 | 1TCK | | 500 | 115 | 29 | 0.288 | Yes | 0.29 |
| | | | 2TCK | | 875 | 490 | 123 | Unlimited | No | 1.23 |
| 2133.333 | 938 | 469 | 1TCK | | 375 | -10 | -3 | -0.025 | NA | NA |
| | | | 2TCK | | 656 | 271 | 68 | 0.678 | Yes | 0.68 |
| 2400.000 | 833 | 417 | 1TCK | | 333 | -52 | -13 | -0.129 | NA | NA |
| | | | 2TCK | | 583 | 198 | 50 | 0.496 | Yes | 0.50 |
| 2666.667 | 750 | 375 | 1TCK | | 300 | -85 | -21 | -0.213 | NA | NA |
| | | | 2TCK | | 525 | 140 | 35 | 0.350 | Yes | 0.35 |
| 3200.000 | 625 | 313 | 1TCK | | 250 | -135 | -34 | -0.338 | NA | NA |
| | | | 2TCK | | 438 | 52 | 13 | 0.131 | Yes | 0.13 |

(56) References Cited

U.S. PATENT DOCUMENTS

| | | | | |
|---|---|---|---|---|
| 2006/0120193 A1* | 6/2006 | Casper | G11C 11/406 | 365/222 |
| 2007/0195376 A1* | 8/2007 | Imai | H04N 1/32561 | 358/448 |
| 2011/0040902 A1* | 2/2011 | Housty | G06F 11/3037 | 710/15 |
| 2011/0047400 A1* | 2/2011 | Blackmon | G06F 11/141 | 713/400 |
| 2011/0199843 A1* | 8/2011 | Dreps | G06F 13/1689 | 365/193 |
| 2011/0219274 A1* | 9/2011 | Cho | G06F 11/00 | 714/708 |
| 2012/0096288 A1* | 4/2012 | Bates | G06F 1/206 | 713/320 |
| 2014/0029367 A1* | 1/2014 | Jung | G11C 11/40615 | 365/222 |
| 2014/0032010 A1* | 1/2014 | Jung | G06F 1/3206 | 700/299 |
| 2014/0125390 A1* | 5/2014 | Ma | H03K 5/1565 | 327/175 |
| 2014/0181392 A1* | 6/2014 | Malladi | G11C 29/028 | 711/105 |
| 2014/0181452 A1* | 6/2014 | Malladi | G11C 29/023 | 711/166 |
| 2014/0211579 A1* | 7/2014 | Lovelace | G11C 11/40607 | 365/200 |
| 2014/0347936 A1* | 11/2014 | Ghaly | G11C 11/56 | 365/185.18 |
| 2015/0039967 A1* | 2/2015 | Romanovskyy | G06F 11/108 | 714/764 |
| 2015/0066819 A1* | 3/2015 | Mozak | G05B 13/02 | 706/12 |
| 2015/0364212 A1* | 12/2015 | Razzaz | G11C 29/023 | 365/193 |
| 2016/0127259 A1* | 5/2016 | Duroiu | H04L 47/783 | 709/226 |
| 2016/0327999 A1* | 11/2016 | Chang | G06F 1/3296 | |
| 2017/0060633 A1* | 3/2017 | Suarez Gracia | G06F 9/48 | |

* cited by examiner

FIG. 4

RETRAINING TABLE 400

| DDR(MT/s) | tCK | | Eye Window | 1tCK pre: 0.8UI | DQS shift due to voltage variation | DQS shift due to temperature shift | Solve for Retrain Interval(s) | Retraining Enabled? | Retraining Interval(s) |
|---|---|---|---|---|---|---|---|---|---|
| | tCK ps | UI ps | Drift Allowance | 2tCK pre: 1.4UI | +/- 2.5% AC Ripple @ 7ps/mV<br>Drift Rate: 7ps/mV | Solve for degrees C<br>4ps/C | C/s for the given system | | |
| | | | | | | | 100 | | |
| 1333.333 | 1500 | 750 | 1TCK | 600 | 215 | 54 | 0.538 | Yes | 0.54 |
| | | | 2TCK | 1050 | 665 | 166 | Unlimited | No | NA |
| 1600.000 | 1250 | 625 | 1TCK | 500 | 115 | 29 | 0.288 | Yes | 0.29 |
| | | | 2TCK | 875 | 490 | 123 | Unlimited | No | 1.23 |
| 2133.333 | 938 | 469 | 1TCK | 375 | -10 | -3 | -0.025 | NA | NA |
| | | | 2TCK | 656 | 271 | 68 | 0.678 | Yes | 0.68 |
| 2400.000 | 833 | 417 | 1TCK | 333 | -52 | -13 | -0.129 | NA | NA |
| | | | 2TCK | 583 | 198 | 50 | 0.496 | Yes | 0.50 |
| 2666.667 | 750 | 375 | 1TCK | 300 | -85 | -21 | -0.213 | NA | NA |
| | | | 2TCK | 525 | 140 | 35 | 0.350 | Yes | 0.35 |
| 3200.000 | 625 | 313 | 1TCK | 250 | -135 | -34 | -0.338 | NA | NA |
| | | | 2TCK | 438 | 52 | 13 | 0.131 | Yes | 0.13 |

POWER EFFICIENT RETRAINING OF MEMORY ACCESSES

BACKGROUND

A variety of techniques have been developed to increase the overall processing speed of computer systems. Vast improvements in integrated circuit processing technologies have contributed to the ability to increase computer processing speeds and memory capacity, thereby contributing to the overall improved performance of computer systems. The ability to produce integrated circuits with deep sub-micron features enables the density of electrical components, such as capacitors to also increase.

Dynamic random access memory (DRAM) chips, comprised of large arrays of capacitors with sub-micron features, are utilized for main memory in computer systems. DRAM is typically inexpensive and high density, thereby enabling large amounts of DRAM to be integrated per device. Most DRAM chips sold today are compatible with various double data rate (DDR) DRAM standards promulgated by the Joint Electron Devices Engineering Council (JEDEC). Increasing DDR DRAM device density and improving the overall technology of the DDR DRAM device within a computer system increases the speed of the DDR DRAM device; however, the higher speeds are more sensitive to voltage and temperature variation. Without periodic retraining, the voltage and temperature variations cause the data (DQ) timing parameters to fall out of tolerance limits, and thereby cause data errors.

Currently, in order to address these issues, a system may simply access a DDR DRAM device at lower speeds than the specified maximum speed without retraining. Operating at lower speeds reduces the system performance and is generally undesirable. Other changes used to avoid or mitigate training of the data timing parameters negatively affect power and performance of the system on chip (SOC) and/or significantly increase the cost of the platform of the SOC.

BRIEF DESCRIPTION OF THE DRAWINGS

FIG. 4 illustrates an example memory training time table according to some embodiments.

Figure 1:
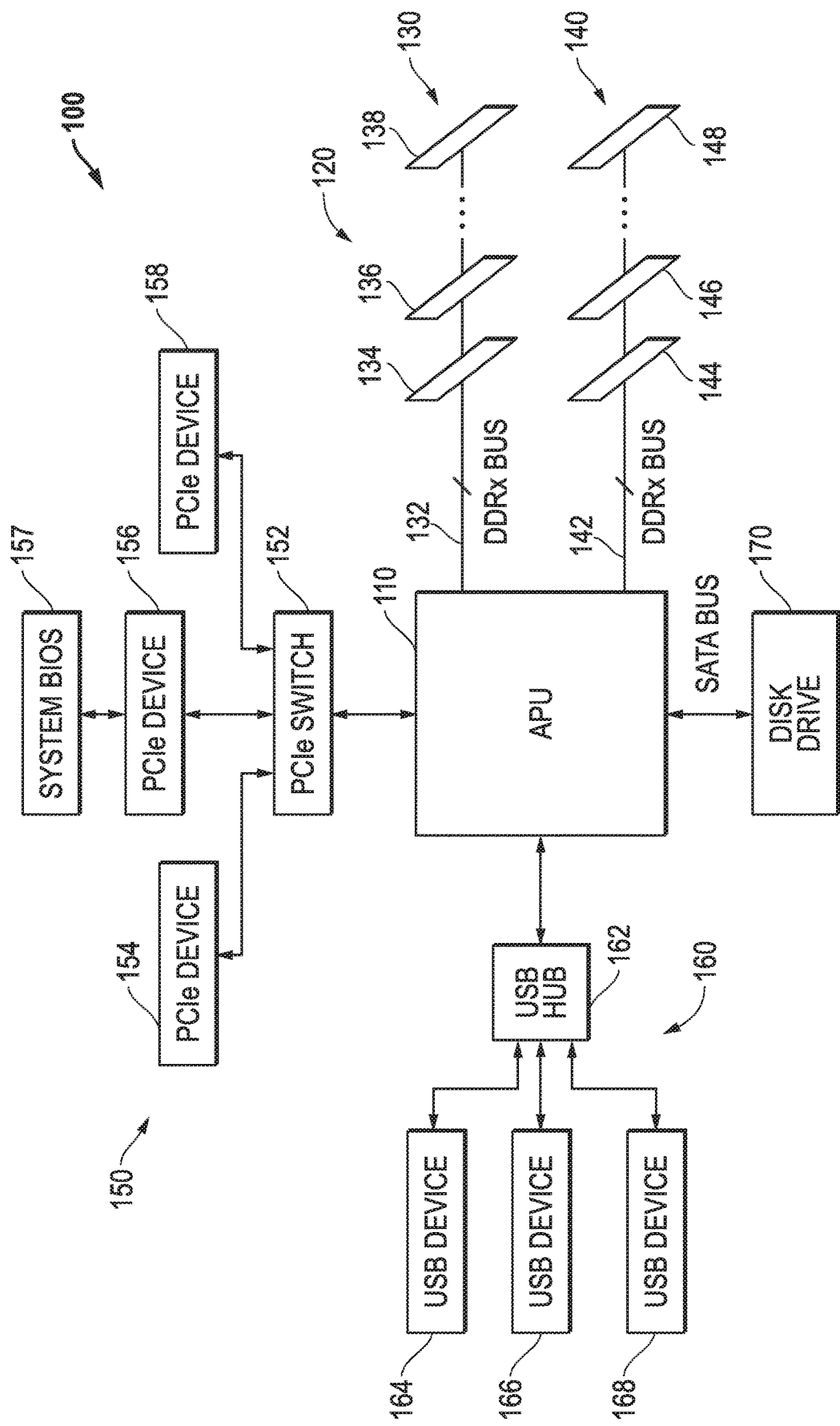
FIG. 1 illustrates in block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described below in one form, a data processing system includes a memory, and a data processor coupled to that memory. The data processor includes a memory controller which is adapted to access the memory in response to scheduled memory access requests. The data processor also includes power management logic, and in response to detection of a memory power state change the power management logic determines whether to retrain or suppress retraining of at least one parameter that is related to accessing the memory. The determination to retrain or suppress is based on an operating state of the memory. Additionally, the power management logic determines a retraining interval for retraining the at least one parameter related to accessing the memory. The power management logic initiates a retraining operation in response to the memory power state change, and based on the operating state of the memory being outside of a predetermined threshold.

In another form, a data processor includes a plurality of data processing clients, a memory controller, and a system management unit. Each data processing client is capable of issuing memory access requests to a memory. The memory controller is coupled to the plurality of data processing clients, and in response to the memory access requests, the memory controller schedules memory accesses to the memory. The system management unit provides retraining requests to the memory controller. The retraining request causes the memory controller to retrain at least one parameter related to accessing the memory based on a retraining interval. Further, the retraining request determines the retraining interval based on an operating state of the memory.

In yet another form, there is described a method for managing a retraining interval of a memory in a memory system via a memory controller. The operating state of the memory is detected. A detection is made of when the utilization of the memory is outside of a predetermined threshold. In response to the utilization of the memory being outside of the predetermined threshold the operating state of the memory is changed to a next operating state. Further, a retraining interval is determined based on the next operating state of the memory.

FIG. 1 illustrates in block diagram form a data processing system 100 according to some embodiments. Data processing system 100 includes generally a data processor 110 in the form of an accelerated processing unit (APU), a memory system 120, a peripheral component interconnect express (PCIe) system 150, a universal serial bus (USB) system 160, and a disk drive 170. Data processor 110 operates as the central processing unit (CPU) of data processing system 100 and provides various buses and interfaces useful in modern computer systems. These interfaces include two double data rate (DDRx) memory channels, a PCIe root complex for connection to a PCIe link, a USB controller for connection to a USB network, and an interface to a Serial Advanced Technology Attachment (SATA) mass storage device.

Memory system 120 includes a memory channel 130 and a memory channel 140. Memory channel 130 includes a set of dual inline memory modules (DIMMs) connected to a DDRx bus 132, including representative DIMMs 134, 136, and 138 that in this example correspond to separate ranks. Likewise, memory channel 140 includes a set of DIMMs connected to a DDRx bus 142, including representative DIMMs 144, 146, and 148. In another example, memory channel 130 includes a soldered unit of low power DDR4 (LPDDR4) connected to a DDRx bus 132 in the place of DIMMs 134, 136, and 138.

PCIe system 150 includes a PCIe switch 152 connected to the PCIe root complex in data processor 110, a PCIe device 154, a PCIe device 156, and a PCIe device 158. PCIe device 156 in turn is connected to a system basic input/output system (BIOS) memory 157. System BIOS memory 157 can be any of a variety of non-volatile memory types, such as read-only memory (ROM), flash electrically erasable programmable ROM (EEPROM), and the like.

USB system 160 includes a USB hub 162 connected to a USB master in data processor 110, and representative USB devices 164, 166, and 168 each connected to USB hub 162. USB devices 164, 166, and 168 could be devices such as a keyboard, a mouse, a flash EEPROM port, and the like.

Disk drive 170 is connected to data processor 110 over a SATA bus and provides mass storage for the operating system, application programs, application files, and the like.

Data processing system 100 is suitable for use in modern computing applications by providing a memory channel 130 and a memory channel 140. Each of memory channels 130 and 140 can connect to state-of-the-art DDR memories such as DDR version four (DDR4), DDR version five (DDR5), LPDDR4, and LPDDR5 and high bandwidth memory (HBM), and can be adapted for future memory technologies. These memories provide high bus bandwidth and high speed operation. However, the memory interface varies the retraining interval based on an operating state of the memory, such as memory voltage and frequency. Therefore, data processing system 100 intelligently schedules periodic retraining of the memory interface.

Figure 2:
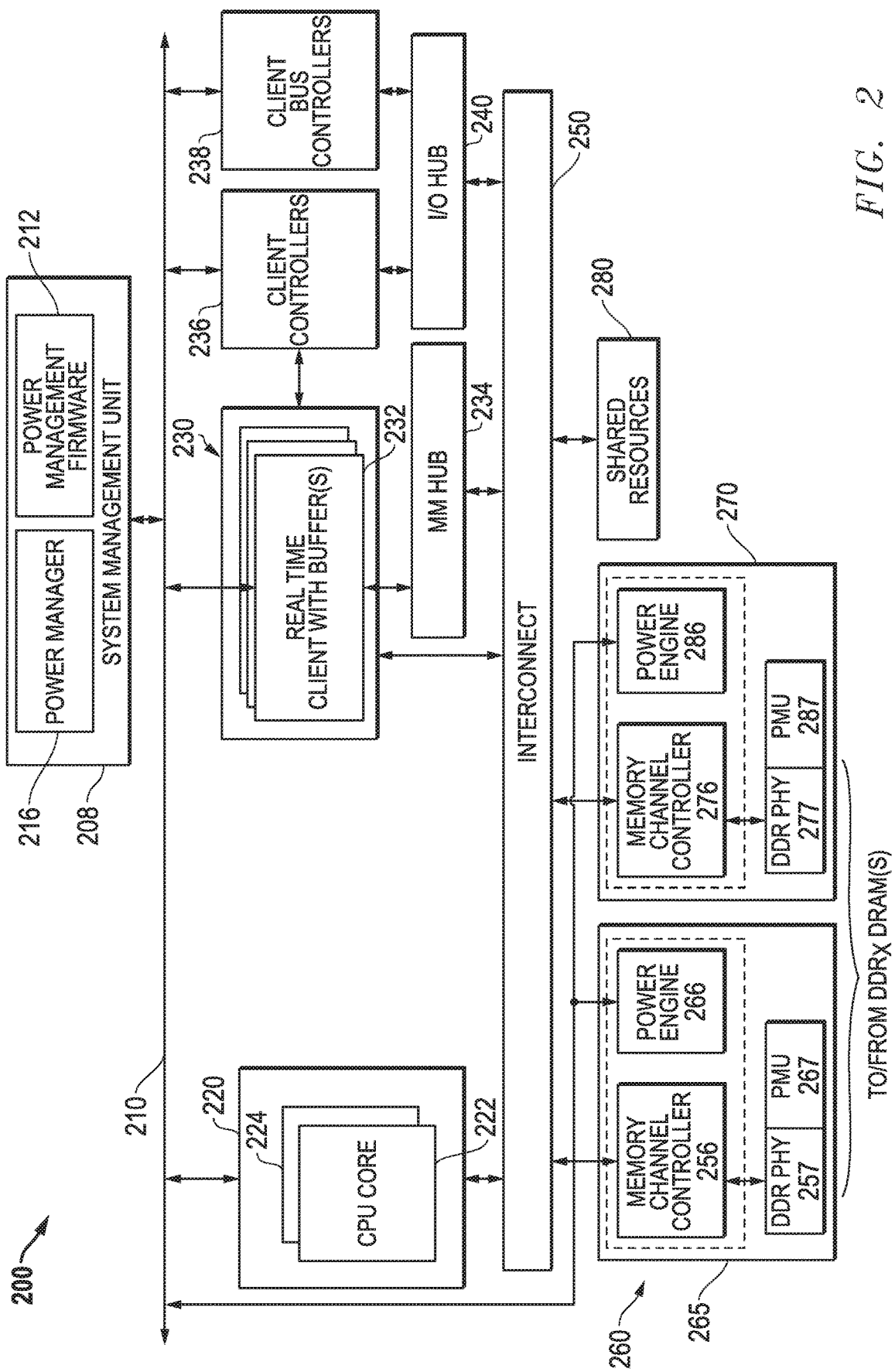
FIG. 2 illustrates in block diagram form an accelerated processing unit (APU) connected to a memory controller and associated physical interface (PHY) suitable for use in the data processing system of FIG. 1.

FIG. 2 illustrates in block diagram form APU 200. APU 200 is suitable for use as APU 110 of FIG. 1. APU 200 includes generally a central processing unit (CPU) core complex 220, real-time clients 230, a memory management hub 234 (or multi-media hub, in some embodiments), an interconnect 250, client controllers 236, client bus controllers 238, an input/output hub 240, a system management unit (SMU) 208, a system management network bus 210, a memory controller system 260, and shared resources 280 which can be associated with shared memory channels or input/output interfaces/links.

CPU core complex 220 includes a CPU core 222 and a CPU core 224. In this example, CPU core complex 220 includes two CPU cores, but in other embodiments CPU core complex 220 can include an arbitrary number of CPU cores. Each of CPU cores 222 and 224 is bidirectionally connected to a system management network (SMN), which forms a control fabric, and to interconnect 250, and is capable of providing memory access requests to interconnect 250. Each of CPU cores 222 and 224 may be unitary cores, or may further be a core complex with two or more unitary cores sharing certain resources such as caches.

Set of real-time clients 230 include real-time client with buffer(s) 232. Real-time client with buffer(s) 232 include read client buffers and/or write client buffers. A read client buffer is useful for example for multi-media controllers and a display engine(s). The read client buffer stores reads from memory. A write client buffer is useful with RT clients such as a display wireless engine, multi-media engine, a camera controller, and a graphics processing unit. A write client buffer typically sends data that will be stored in memory. Real-time client with buffer(s) 232 is bidirectionally connected to a common memory management hub 234 for uniform translation into appropriate addresses in a memory system, and memory management hub 234 is bidirectionally connected to interconnect 250 for generating memory accesses and receiving read data returned from the memory system. Real-time client with buffer(s) 232 is also bidirectionally connected to SMN bus 210 and to interconnect 250. Additionally, the buffer(s) of real-time client with buffer(s) 232 is capable of providing or receiving data for memory access requests to or from interconnect 250 through memory management hub 234. In this regard, APU 200 may either support a unified memory architecture in which CPU core complex 220 and real-time client with buffer(s) 232 share the same access to memory, the same memory space, or a portion of the memory space.

Client controllers 236 include, for example, a USB controller, a Serial Advanced Technology Attachment (SATA) interface controller, and a solid-state drive (SSD) controller, each of which is bidirectionally connected to a system hub 240 and to SMN bus 210. These two controllers are merely exemplary of peripheral controllers that may be used in APU 200.

Client bus controllers 238 are peripheral controllers that may include a system controller and a PCIe controller. Client bus controllers 238 are bidirectionally connected to input/output (I/O) hub 240 and to the SMN bus 210. I/O hub 240 is also bidirectionally connected to interconnect 250. Thus, for example, CPU core 222 can program registers in each client controller associated with client controller 236 through accesses that interconnect 250 routes through I/O hub 240.

SMU 208 is a local controller that controls the operation of the resources on APU 200 and synchronizes communication among them. SMU 208 is the central thermal and power management controller for data processing system 100. SMU 208 includes power manager 216 and power management firmware 212. SMU 208 manages power-up sequencing of the various processors on APU 200 and controls multiple off-chip devices via reset, enable and other signals. SMU 208 includes one or more clock sources not shown in FIG. 2, such as a phase locked loop (PLL), to provide clock signals for each of the components of APU 200. SMU 208 detects variations in operating states of data processing system 100. For example, SMU 208 provides variations in the operating states of temperature and voltage to power management firmware 212. Power management firmware 212 dynamically assigns a memory power state change signal, that corresponds to a next power state of the memory, to power manager 216. Power manager 216 dynamically provides a retrain signal to SMN bus 210. The retrain signal provided to SMN bus 210 enables systematic retraining of the memory and management of real-time clients 230.

Memory controller system 260 includes a set of memory controllers 265 and 270, which themselves further include memory channel controller 256 and 276, and power engine 266 and 286, respectively, each of which is bidirectionally connected to SMN bus 210. A host interface bidirectionally connects memory channel controller 256 to interconnect 250 over a scalable data port (SDP). A physical interface bidirectionally connects memory channel controller 256 to double data rate (DDR) physical interface (PHY) 257 over a bus that conforms to the DDR-PHY Interface (DFI) Specification. Similarly, a physical interface bidirectionally connects memory channel controller 276 to DDR PHY 277, and conforms to the DFI specification. DDR PHYs 257 and 277 respectively include power management units (PMUs) 267 and 287. Power engine 266 is bidirectionally connected to SMU 208 over SMN bus 210, to PMU 267, and is also bidirectionally connected to memory channel controller 256. Power engine 286 is bidirectionally connected to SMU 208 over SMN bus 210, to PMU 287, and is also bidirectionally connected to memory channel controller 276. In some embodiments memory controller system 260 includes one memory controller and an associated DDR PHY and PMU. In still another embodiment, memory controller system 260 includes, in part, an instantiation of a memory controller having two memory channel controllers and uses a shared power engine 266 to control operation of both memory channel controller 256 and memory channel controller 276.

APU 200 also implements various system monitoring functions and detects various power management events. In particular, one system monitoring function is thermal monitoring. APU 200 utilizes the thermal monitoring, in part, to adaptively determine a next retraining interval. For example, during continuous thermal monitoring, SMU 208 receives a plurality of measured temperatures. The plurality of measured temperatures includes a first measured temperature of data processor 100 and a second measured temperature of a temperature sensor in proximity to memory system 120. Accordingly, SMU 208 selectively retrains at least one parameter related to accessing the memory in response to detecting a temperature change above a threshold and a change in a memory power state. Further, SMU 208 selectively suppresses retraining of at least one parameter related to accessing the memory in response to detecting no temperature change above a threshold and no change in a memory power state. Consequently, SMU 208 is able to determine a next retraining interval adaptively, based on both the power state of the memory and at least one measured temperature, as discussed further below.

Figure 3:
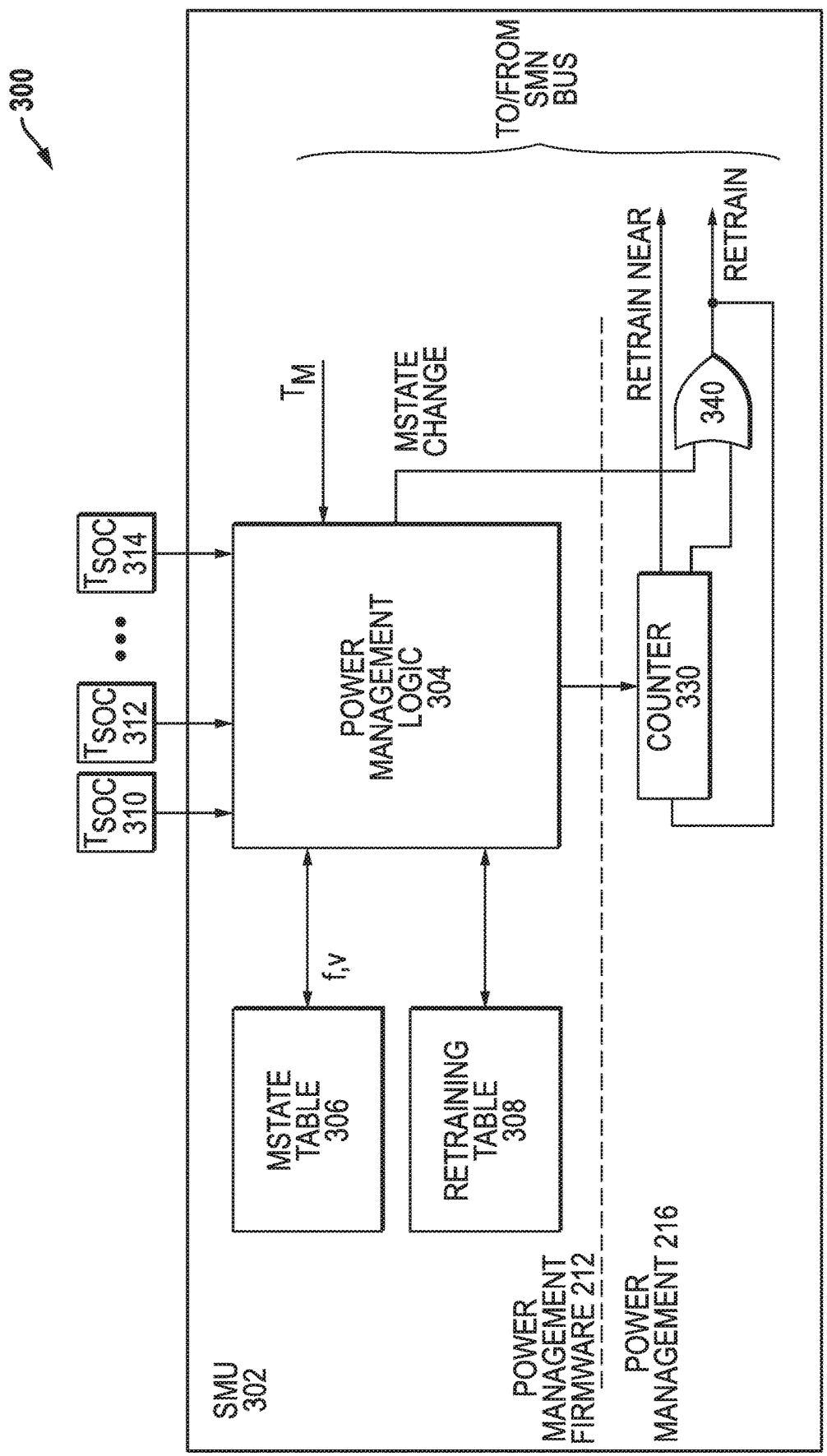
FIG. 3 illustrates in block diagram form a system on a chip (SOC) having a system management unit (SMU) suitable for use as the SMU of FIG. 2 according to some embodiments.

FIG. 3 illustrates in block diagram form a system on a chip (SOC) having a SMU suitable for use such as the SMU of FIG. 2, according to some embodiments. SOC 300 includes, at least in part, SMU 302. SMU 302 includes a power management firmware 212 and power manager 216. SOC 300 also includes, in part, temperature sensors 310, 312, and 314 which provide a measured temperature value (Tsoc) to power management logic 304. Power management firmware 212 includes a power management logic 304, a memory state (mstate) table 306, and a retraining table 308. Power management logic 304 has an input for receiving a temperature of the memory ($T_M$), and the $T_{soc}$ from temperature sensors 310, 312, and 314, and an output. Mstate table 306 has frequency and voltage values that correspond to the current memory state. Retraining table 308 has a plurality of empirically determined values that characterize the memory, for example, clock period (tCK), unit interval, data eye drift allowance, data strobe (DQS) shift due to voltage variation, DQS shift due to temperature variation, and retraining status. Power manager 216 includes counter 330 and OR gate 340. Counter 330 has a first input and a second input for receiving input from power management logic 305. OR gate 340 has input for receiving an mstate change signal from power management logic 304, and an input from counter 330. In response to at least one input of OR gate 340 being a value of one, OR gate 340 outputs a retrain signal to SMN bus 210. Counter 330 additionally receives the retrain signal as feedback input to demarcate counter 330 for determining the next training interval.

In operation, power management logic 304 is connected to and receives select operating state information from the memory, mstate table 306, retraining table 308, and temperature sensors on the rest of SOC 302. Operating state information includes temperatures associated with the memory, temperatures associated with SOC 302, a voltage of the memory, and the frequency of the memory. SMU 208 is also adapted to connect to memory system 120 of FIG. 1. As described above, memory system 120 can include multiple ranks of memory implemented as DIMMs 134, 136, and 138 in FIG. 1. SMU 208 includes power management logic 304 for periodically providing retraining requests to memory controller 265 to cause memory controller 265 to retrain at least one parameter related to accessing the memory based on a retraining interval. Power management logic 304 determines the retraining interval based, in part, on the operating state of one or more DIMMs 134, 136, and 138.

Power management logic 304 determines a next retraining interval to retrain timing parameters associated with the memory interface. For example, these parameters include the read data in to DQS delay and the write data out to DQS delay. Retraining involves placing the data strobe at or near the center of the data eye. Power management logic 304 determines the retraining interval based on: (i) a static calculation, (ii) both a power state of the memory and at least one measured temperature, or (iii) both a next power state of the memory and a plurality of measured temperatures. Power management logic 304 can determine a next training interval based on a static calculation as provided by retraining table 308. Retraining table 308 includes a plurality of empirically determined values. Alternatively, power management logic 304 determines a next training interval adaptively. Power management logic 304 receives a mstate change notification from mstate table 306, and a first measured temperature from a temperature sensor such as $T_{SOC}$ 310 on data processor 100. The first measured temperature is compared to subsequent measured temperatures from temperature sensors that are in proximity to the memory. Power management logic 304 determines the next training interval based on the received mstate change notification and a temperature variation beyond a predetermined threshold. Responsively, power management logic 304 periodically provides a retraining signal, and provides a retraining near signal to the plurality of data processing clients 230, at least a predetermined time before providing the retraining signal to the memory controller. In response to power management logic 304 detecting no temperature change above a threshold and no change in a memory power state, power management logic 304 suppresses retraining.

In general, power management logic 304 statically or dynamically determines retraining interval request to retrain a timing relationship between data and a corresponding data strobe. Power management 304 utilizes retraining table 308 to provide a statically determined retraining interval request. Dynamic retraining interval calculations, on the other hand, utilize values that are adaptively determined and/or measured during real-time temperature sensor measurements. The memory retraining interval can be determined per mstate. Thus, power management logic 304 determines whether to implement static or dynamic interval retraining calculations per mstate. In response to power management logic 304 detecting a mstate change, power management logic 304 initiates a retraining operation. In response to power management logic 304 providing a retrain near signal to data processing clients 230, client controller 236 initiates a buffer management operation in response to the retrain near signal. The buffer management operation fills respective real time client buffers 232 in preparation for read operations, and empties respective real time client buffers 232 in preparation for write operations to continue during the period memory retraining.

In one embodiment, Tsoc 310, 312, and/or 314 are distributed on SOC 300. Power management logic 304 polls Tsoc 310, 312, and/or 314 periodically in preconfigured intervals to determine when the temperature variations are beyond the predetermined threshold. Polling Tsoc 310, 312, and/or 314 enables power management logic 304 to avoid retraining during periods when the temperature variations associated with SOC 302 are not significant. For example, idle periods and/or periods of sustained performance such as during gaming applications, power management logic suppresses memory retraining since the parameters have likely not changed.

In another embodiment, power management logic 304 selectively provides a memory retraining interval based on a fixed timer value and a dynamically calculated drift value. In response to detection of a pre-defined frequency state, power management logic 304 increments counter 330 to move closer to initiating a retraining operation. In response to detecting another pre-defined frequency state, power management logic 304 utilizes the dynamically calculated drift value of the operating state of the memory to determine the retraining interval.

Determining the retrain interval statically and/or dynamically enables SMU 208 to intelligently select the retraining interval or select when to suppress retraining of at least one parameter related to accessing the memory based on an operating state of the memory. Intelligently implementing the retrain interval is advantageous for maintaining buffer operations during retrain intervals, preserving life of the battery by suppressing retraining intervals in response to no power state change and no temperature variations, and for optimizing retraining during preselected memory performance states. Enabling SMU 208 to intelligently implement retraining intervals minimizes retraining latency and memory blackout time. More specifically, SMU 208 intelligently determines the scheduling of blackout events (eg. Pstate change, memory retraining, and PHY ZQ calibration) to not occur consecutively. Instead, the blackout events are selectively scheduled during separate periods of operation, and the client buffers are managed to maintain operative activity during the blackout event. Therefore, intelligent scheduling by SMU 208 reduces the worst-case latency to only the duration of the longest blackout event, versus the additive time duration of all blackout events.

FIG. 4 illustrates an exemplary retraining table according to some embodiments. Retraining table 400 includes a plurality of empirically determined values that enable the retraining interval to be pre-calculated based on silicon studies of the data eye window for the defined system. Retraining table 400 takes into consideration the worst-case voltage and temperature variations. The empirical values in retraining table 400 are provided to power management logic 304 as a table of retraining times to enable a retraining interval per frequency for the specified SOC. The static calculations provided in retraining table 400 are for temperature and voltage variations based on characterization studies. The static values help, for example to determine how battery life corresponds to various performance states.

Figure 5:
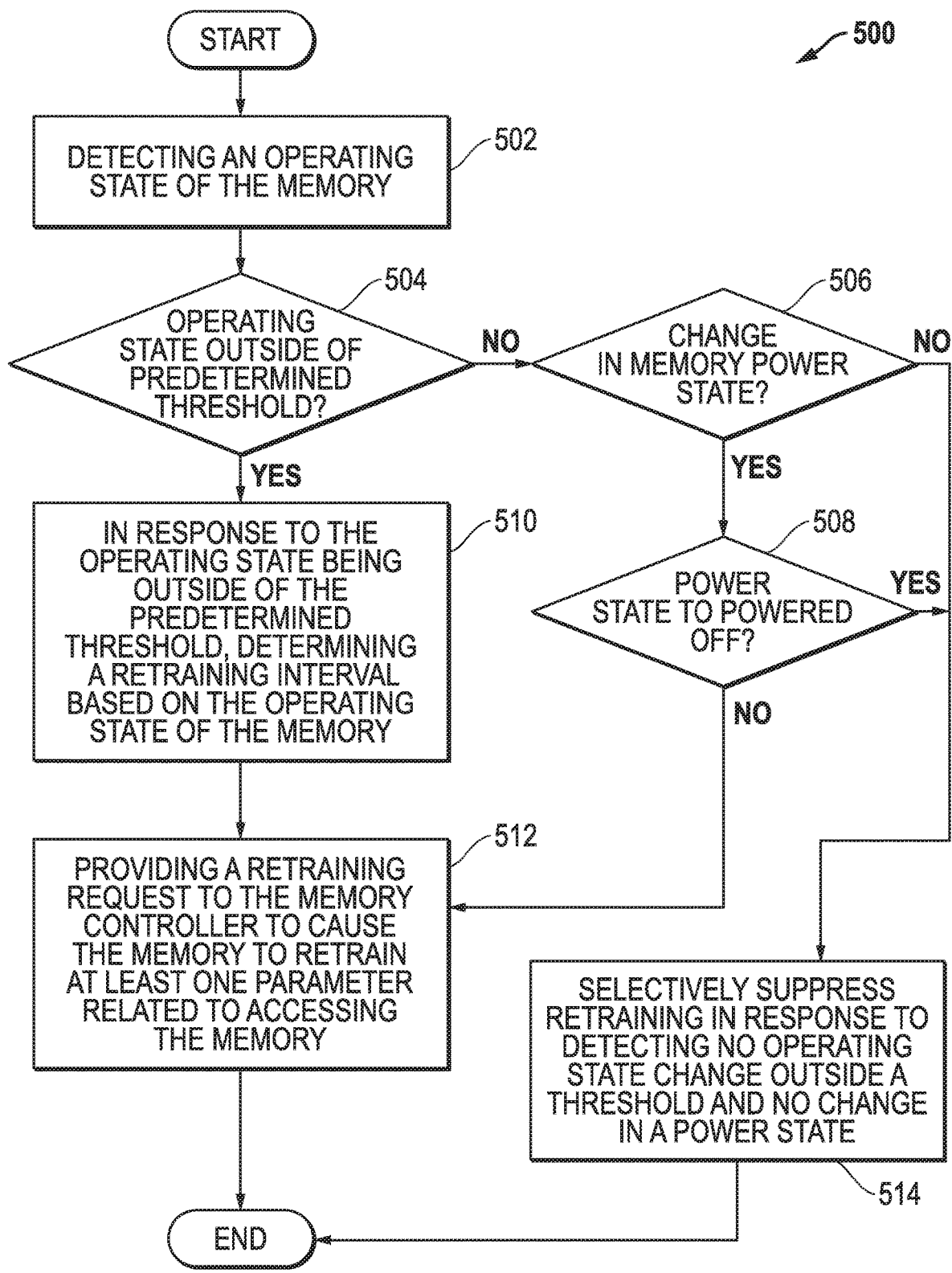
FIG. 5 illustrates a flow diagram that may be used by the SMU of FIG. 3 according to some embodiments.

FIG. 5 illustrates a flow diagram of method 500 that may be used by SMU 302 of FIG. 3 according to some embodiments. At block 502 an operating state of the memory is detected. At block 504 a determination is made whether an operating state is outside of the predetermined threshold. In response to the operating state not being outside of the predetermined threshold, a determination is made whether there is a change in the memory power state at block 506. In response to there not being a change in the memory power state the process continues to block 514. At block 514, implementation of the retraining signal is selectively suppressed in response to detecting no operating state change outside a threshold and no change in a power state. The process continues to the end block. In response to power management logic detecting a change in the memory power state (block 506), a determination is made, at block 508, whether the power state is powered off. In response to the power state being switched to powered off, the process continues to block 514. In response to the power state not being switched to powered off (block 508), the process continues to block 512.

At block 504, in response to the operating state being outside the predetermined threshold, the process continues to block 510. At block 510, power management logic 304 determines a retraining interval based on the operating state of the memory. At block 512, a retraining request is provided to the memory controller to cause the memory to retrain at least one parameter related to accessing the memory. The process concludes at the end block.

Some or all of the method illustrated in FIG. 5 may be governed by instructions that are stored in a computer readable storage medium and that are executed by at least one processor. Each of the operations shown in FIG. 5 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

APU 200 of FIG. 2 or any portion thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. Memory controller 265 and 270 may interface to other types of memory besides DDRx memory, such as high bandwidth memory (HBM), RAMbus™ DRAM (RDRAM), and the like. While the illustrated embodiment showed each rank of memory corresponding to separate DIMMs, in other embodiments each DIMM can support multiple ranks. Moreover, the memory channel may comprise a plurality of ranks of double rate version four DDR4 memory.

Accordingly, it is intended by the appended claims to cover all modifications of the disclosed embodiments that fall within the scope of the disclosed embodiments.

What is claimed is:

1. A data processor, comprising:
a plurality of data processing clients, each data processing client capable of issuing memory access requests to a memory;
a memory controller coupled to said plurality of data processing clients, wherein said memory controller schedules memory accesses to said memory in response to said memory access requests; and a system management unit for providing retraining requests to said memory controller to cause said memory controller to retrain at least one parameter related to accessing said memory based on a retraining interval, and for determining said retraining interval based on a memory state of said memory, wherein said memory state comprises a frequency of a clock signal of said memory, and wherein said system management unit determines whether to implement static or dynamic interval retraining calculations for each of a plurality of memory states of said memory.

2. The data processor of claim 1, wherein when implementing dynamic internal retraining, said system management unit further determines a retraining interval based on a temperature of said memory.

3. The data processor of claim 1, wherein when implementing dynamic internal retraining, said system management unit further determines a retraining interval based on a voltage of said memory.

4. The data processor of claim 1, wherein in response to a memory state change to implement static retraining, said system management unit determines a next retraining interval based on a static calculation.

5. The data processor of claim 4, wherein in response to said memory state change, said system management unit further determines said next retraining interval using a retraining table, wherein said retraining table includes a plurality of empirically determined values.

6. The data processor of claim 1, wherein said system management unit determines to implement dynamic interval retraining calculations, said system management unit determines a next retraining interval adaptively, based on both said memory state of said memory and at least one measured temperature.

7. The data processor of claim 6, wherein said system management unit determines to implement dynamic interval retraining calculations, said system management unit determines said next retraining interval adaptively based on both said memory state of said memory and a plurality of measured temperatures.

8. The data processor of claim 7, wherein said plurality of measured temperatures comprises a first measured temperature of the data processor and a second measured temperature of a temperature sensor in proximity to said memory.

9. The data processor of claim 1, wherein said system management unit determines to implement dynamic interval retraining calculations, said system management unit uses adaptive retraining to selectively suppress retraining in response to detecting no temperature change above a threshold and no change in said memory state of said memory.

10. The data processor of claim 1, wherein said system management unit periodically provides a retraining signal based on said retraining interval, and provides a retraining near signal to said plurality of data processing clients, at least a predetermined time before providing said retraining signal to said memory controller.

11. The data processor of claim 1, wherein said system management unit continuously monitors said memory state and performs a selected one of static retraining and adaptive interval retraining based on a selected one of a plurality of memory states.

12. A data processing system, comprising:
a memory;
a data processor coupled to said memory and comprising a memory controller, said memory controller adapted to access said memory in response to scheduled memory access requests, the data processor having power management logic, wherein in response to detection of a memory state change, wherein said memory state comprises a frequency of a clock signal of said memory, and, said power management logic:
determines whether to implement static or dynamic interval retraining calculations for a current memory state of said memory;
determines a fixed retraining interval for retraining at least one parameter related to accessing said memory if said current memory state indicates to use static interval retraining calculations and periodically retrains said memory according to said fixed retraining interval; and
initiates a retraining operation in response to said at least one parameter being outside of a predetermined threshold if said current memory state indicates to use dynamic interval retraining calculations.

13. The data processing system of claim 12, wherein when implementing dynamic internal retraining, said power management logic further determines a retraining interval based on a voltage and a frequency of said memory.

14. The data processing system of claim 12, wherein:
said power management logic detects an initial memory state and a change in said initial memory state; and
said power management logic responsively provides:
a retrain signal to said memory controller to retrain a timing relationship between data and a corresponding data strobe; and
a retrain near signal to a client controller, wherein said client controller initiates a buffer management operation in response to said retrain near signal.

15. The data processing system of claim 12, wherein:
in response to detecting a memory state change in which a next operating state indicates to use static interval retraining calculations, said power management logic selectively determines a next retraining interval based on a static calculation and a retraining table that includes a plurality of empirically determined values.

16. The data processing system of claim 12, wherein if said current memory state indicates to use dynamic interval retraining calculations:
said power management logic determines a next retraining interval adaptively, based on both said current memory state of said memory and at least one measured temperature.

17. A method for retraining a memory, comprising:
detecting a current memory state of a plurality of memory states of the memory, wherein said memory state comprises a frequency of a clock signal of said memory;
determining whether to implement static or dynamic interval retraining calculations in response to said current memory state;
in response to detecting that said current memory state indicates to implement static retraining:
determining a retraining interval in response to an operating frequency and at least one other parameter; and
retraining said memory periodically based on said retraining interval, and
in response to detecting that said current memory state indicates to implement dynamic retraining:
initiating retraining in response to a change in said at least one other parameter greater than a threshold, thereby selectively suppressing retraining when there is no change in said at least one other parameter.

18. The method of claim 17, wherein said determining comprises:
   determining said retraining interval in response to a change in a voltage greater than said threshold.

19. The method of claim 17, wherein said determining comprises:
   determining said retraining interval in response to a change in a temperature greater than said threshold.

* * * * *